(12) United States Patent
Beer

(10) Patent No.: US 10,590,980 B2
(45) Date of Patent: Mar. 17, 2020

(54) BLIND RIVET ELEMENT, PRODUCTION AND USE THEREOF

(71) Applicant: Bossard AG, Zug (CH)

(72) Inventor: Florian Beer, Burglengenfeld (DE)

(73) Assignee: Bossard AG, Zug (CH)

( * ) Notice: Subject to any disclaimer, the term of this patent is extended or adjusted under 35 U.S.C. 154(b) by 228 days.

(21) Appl. No.: 15/534,403

(22) PCT Filed: Dec. 10, 2015

(86) PCT No.: PCT/CH2015/000181
§ 371 (c)(1),
(2) Date: Nov. 13, 2017

(87) PCT Pub. No.: WO2016/090503
PCT Pub. Date: Jun. 16, 2016

(65) Prior Publication Data
US 2018/0142720 A1    May 24, 2018

(30) Foreign Application Priority Data

Dec. 10, 2014    (DE) .......................... 10 2014 018 159

(51) Int. Cl.
*F16B 37/06* (2006.01)
(52) U.S. Cl.
CPC ............ *F16B 37/067* (2013.01); *F16B 37/06* (2013.01)
(58) Field of Classification Search
CPC .......... F16B 5/04; F16B 13/061; F16B 19/04; F16B 37/067; F16B 37/06; Y10T 24/42; Y10T 29/49943; Y10T 29/49956
(Continued)

(56) References Cited

U.S. PATENT DOCUMENTS

| 1,320,623 A | * | 11/1919 | Kennedy | ............... F16B 13/061 411/38 |
| 2,018,251 A | * | 10/1935 | Croessant | ............. F16B 13/061 411/37 |

(Continued)

FOREIGN PATENT DOCUMENTS

BE    864969 A2    7/1978
CN    100351530    11/2007
(Continued)

OTHER PUBLICATIONS

International Search Report for PCT/CH2015/000181, dated Mar. 10, 2016.
(Continued)

*Primary Examiner* — Roberta S Delisle
(74) *Attorney, Agent, or Firm* — Marshall, Gerstein & Borun LLP

(57) ABSTRACT

In order to further develop a blind rivet element (5) comprising a head (51), an adjoining hollow shaft (53), the outer side of which has an outer diameter smaller than the head (51), and an internal thread (54) provided inside the shaft (53) and having an axial separation from the head (51), in such a way that when installed the blind rivet element (5) always forms a controlled deformation, in particular in the form of a bulge, at the same specifiable location, it is proposed that the shaft (53) is provided with a radially outwardly protruding adjustment contour (55) in the region of the head (51), that the shaft (53) has a curvature (57) formed in the radial direction and that said curvature (57) is arranged between the adjustment contour (55) and the internal thread (54).

14 Claims, 1 Drawing Sheet

(58) Field of Classification Search
USPC .................. 411/34, 37, 38, 500, 501, 508
See application file for complete search history.

(56) References Cited

U.S. PATENT DOCUMENTS

| | | | | |
|---|---|---|---|---|
| 3,014,563 | A * | 12/1961 | Bratton | F16B 5/0258 |
| | | | | 403/167 |
| 3,136,203 | A * | 6/1964 | Davis | F16B 19/1054 |
| | | | | 29/509 |
| 3,174,387 | A * | 3/1965 | Fischer | F16B 13/061 |
| | | | | 411/37 |
| 3,208,674 | A | 9/1965 | Bailey | |
| 3,505,921 | A * | 4/1970 | Wigam | F16B 37/067 |
| | | | | 411/34 |
| 4,182,216 | A | 1/1980 | DeCaro | |
| 4,208,944 | A * | 6/1980 | Moryl | F16B 37/043 |
| | | | | 411/182 |
| 4,642,009 | A * | 2/1987 | Fischer | F16B 13/061 |
| | | | | 411/38 |
| 5,205,688 | A * | 4/1993 | Sundstrom | F16B 13/061 |
| | | | | 411/34 |
| 6,161,998 | A | 12/2000 | Brown | |
| 6,602,034 | B2 * | 8/2003 | Wakai | F16B 13/061 |
| | | | | 411/37 |
| 2005/0180841 | A1 | 8/2005 | Cao | |
| 2014/0130335 | A1 | 5/2014 | Bickford et al. | |

FOREIGN PATENT DOCUMENTS

| | | |
|---|---|---|
| DE | 9114473 U1 | 2/1993 |
| DE | 19545580 A1 | 6/1997 |
| DE | 19727534 A1 | 1/1999 |
| DE | 197 36 027 A1 | 3/1999 |
| DE | 69913493 T2 | 5/2004 |
| EP | 1924775 B1 | 7/2011 |
| FR | 982415 A | 6/1951 |
| FR | 2302441 A1 | 9/1976 |
| GB | 854830 A | 11/1960 |
| JP | H09192526 A | 7/1997 |
| JP | 2003154286 A | 5/2003 |
| KR | 20120139638 A | 12/2012 |
| SU | 1178487 A1 | 9/1985 |
| WO | WO-2013053066 A1 | 4/2013 |

OTHER PUBLICATIONS

Written Opinion for international application No. PCT/CH2015/000181, dated Dec. 10, 2015.
International Search Report for PCT/CH2015/000030, dated Dec. 14, 2015.
International Search Report for International Application No. PCT/CH2015/000031, dated Dec. 11, 2015.
International Search Report for PCT/CH2015/000032, dated Dec. 4, 2015.
International Search Report for PCT/CH2016/000033, dated Jun. 6, 2016.
Office Action for Chinese Application No. 2015/80075244.9, dated Nov. 1, 2018.
Second Office Action and Search Report for Chinese Application No. 2015/80075244.9, dated Aug. 22, 2019.

* cited by examiner

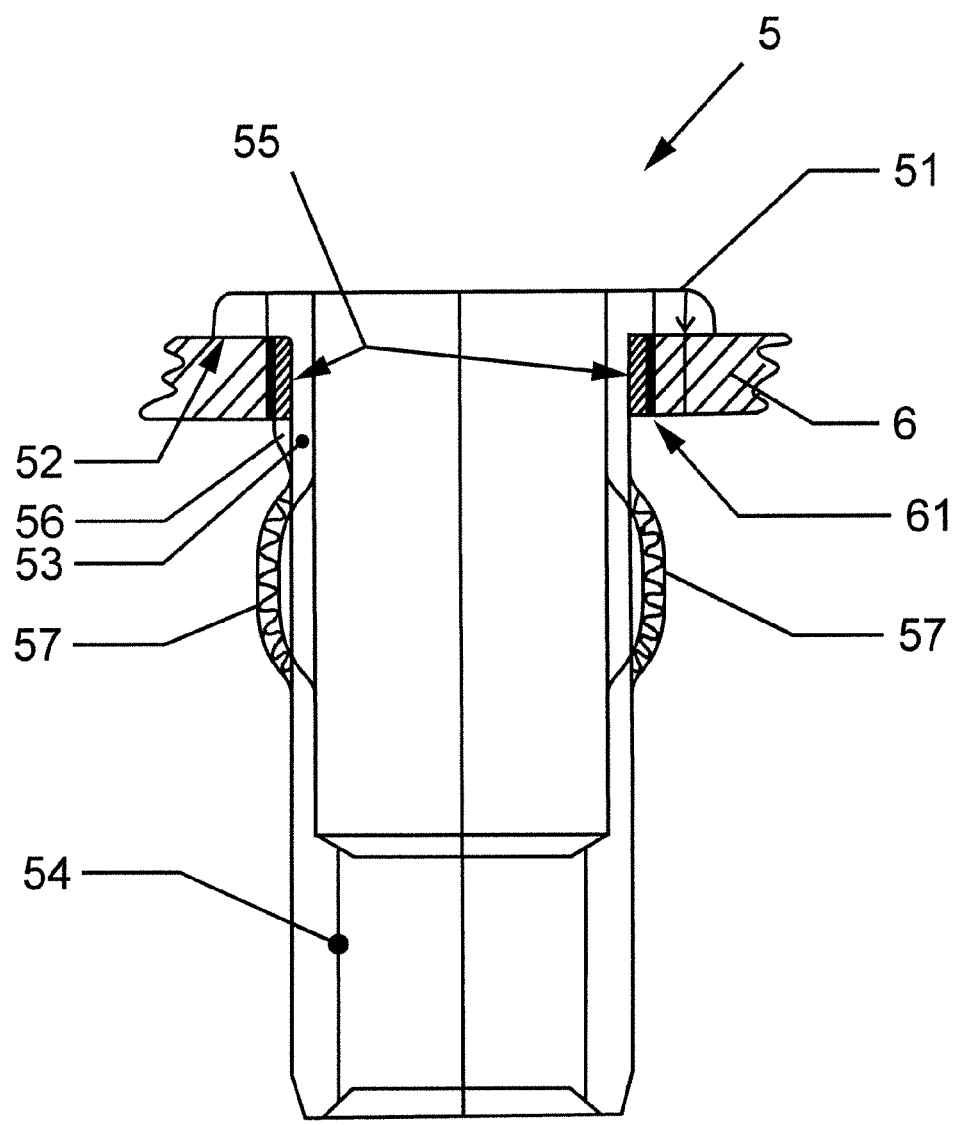

BLIND RIVET ELEMENT, PRODUCTION AND USE THEREOF

CROSS-REFERENCE TO RELATED APPLICATIONS

This is the United States national phase of International Patent Application No. PCT/CH2015/000181, filed Dec. 10, 2015, which claims the priority benefit of German Application No. 10 2014 018 159.6, filed Dec. 10, 2014. Each of the foregoing is expressly incorporated herein by reference in the entirety.

FIELD OF THE DISCLOSURE

It is the object of the present invention to provide a generic blind rivet element, namely a blind rivet element with a head, with an adjoining hollow shaft, the outer side of which has an outer diameter smaller than the head, and with an internal thread provided inside the shaft and having an axial separation from the head.

It is further the object of the present invention to provide a method for the manufacturing of said blind rivet element as well as a use thereof.

BACKGROUND ART

Said generic blind rivet elements are known (e.g. document U.S. Pat. No. 3,136,203) and are inserted into a bore of an object that is only accessible from one side in such a way that the head abuts to an edge area of the one end of the bore. Afterwards, a setting device or setting tool is inserted into the hollow shaft from the same side, with its outer thread screwed into said inner thread which fits to the latter.

If the shaft is then pulled in a direction towards the head by means of the setting device or setting tool, while the head is pressed onto the object and is therefore compressed, a bulge protruding radially to the outside is formed, namely outside the bore between the head and the inner thread. This arranges around the edge area of the other end of the bore, such that the blind rivet element is fixed in the bore of the object.

Here, this connection has the disadvantage that, while setting the blind rivet element into the targeted object, the bulge doesn't always form at the same specifiable position outside the bore. Furthermore, due to the bearing stress, this connection can neither be installed in brittle materials like acryl glass (PMMA=polymethylmethacrylate) nor in carbon, nor in soft materials, like plastics.

Concerning the technological background of the present invention, further attention is drawn to the documents EP 1 532 371 B1, WO 2007/035480 A2 and DE 91 14 473 U1.

GENERAL DESCRIPTION

The problem to be solved by the present invention in regard of above mentioned disadvantages and insufficiencies and in consideration of the outlined prior art, is therefore to further develop a generic blind rivet element, such that for mounting a controlled deformation is always formed at the same specifiable location, in particular in form of a bulge.

For a generic blind rivet element, this problem is solved as stipulated by the invention by means of the characteristic features, therefore by the features that the hollow shaft is provided with a radially outwardly protruding adjustment contour in the area of the head, the shaft has a curvature formed in the radial direction, in particular wherein the curvature is rotationally symmetric or star-like symmetric, and this curvature is arranged between the adjustment contour and the internal thread.

The adjustment contour is preferably a centering element. The adjustment contour can be formed in circumferential direction as a surrounding collar with a predefined outer diameter. The curvature is preferably a protrusion, in particular a protrusion or pre-bulge protruding outwardly. Furthermore, the curvature extends preferably in circumferential direction.

The adjustment contour, in particular formed in the manner of a level or step, is in principle freely adjustable regarding its height and/or geometry and can have a circular, elliptical, squared, or hexagonal form or can comprise centering teeth.

After inserting the blind rivet element, this adjustment contour serves for holding the head centrically in the one end of the bore, whereas the surrounding curvature comes to lie outside the bore, in particular if this curvature is formed advantageously towards the outside, as a protrusion or pre-bulge extending in particular in circumferential direction, but not protruding beyond the adjustment contour.

The protrusion or pre-bulge is in principle freely adjustable with regard to position, radius and geometry and can be of elliptical or semi-circular form, in particular comprising a step.

The protrusion or pre-bulge forms an area of destabilisation in the wall of the shaft. Upon setting the blind rivet element as stipulated by the invention, the emerging bulge, which is in particular fully closed and thus not slotted, is formed in the region of the protrusion or pre-bulge and therefore always precisely at the same specified location. The state of the art does not show any example of such a blind rivet element as stipulated by the invention.

In this way it is possible to benefit from significantly thicker walls due to the protrusion or pre-bulge, because the setting force is significantly lower than for conventional blind rivet elements. Therefore, the present invention achieves significantly higher clamping forces between the bulge and the head of the blind rivet element.

In addition, the outer diameter of the blind rivet element can be enlarged in this respect, such that the blind rivet element exhibits higher torsional strength under strain.

The adjustment contour and the protrusion or pre-bulge interfere with each other and are therefore interdependent. For the object, e.g. the metal sheet, having a thickness of about six millimetres, a small adjustment contour with a height of for example about two millimetres in combination with a protrusion or pre-bulge beginning very close to the adjustment contour and having a radius of for example about twelve millimetres, can achieve the characteristic that the blind rivet element has a very high torsional strength. This results from the bearing stress of the protrusion or pre-bulge.

In contrast, if the embodiment is set into an object, e.g. a metal sheet, of only about 2.5 millimetres, the blind rivet element does not exhibit any bearing stress and can likewise be installed into brittle materials.

The clamping region or the thickness of the carrier material respectively, can be adapted to the blind rivet element dependent on the distance between the protrusion or pre-bulge and the adjustment contour. The greater the distance is, the greater is the bearing stress for a great carrier material thickness and the lower is the bearing stress down to zero, for a small carrier material thickness, respectively.

In other words: the smaller the distance between the end of the adjustment contour and the bottom surface of the of the carrier material, the lower the bearing stress; the greater the distance between the end of the step of the adjustment contour and the bottom surface of the carrier material, the higher the bearing stress and therefore the clamping force of the blind rivet element.

The adjustment contour can serve for centering the protrusion or pre-bulge independently thereof or in connection therewith. The adjustment contour always has clearance in the bore (even after mounting the blind rivet element).

There is an interaction between the carrier material and the bulge by means of the adjustment contour, in particular to such an extent that the final state of the blind rivet element can be defined by the starting point. The blind rivet element can again be axially moved after dismantling by means of a recess of the part to be mounted.

If the adjustment contour is not circular, but has a squared shape, the blind rivet element can be pre-assembled by slightly tightening the protrusion or pre-bulge. Afterwards, the blind rivet element can be shifted into the correct position shortly before mounting, similar to a cage nut. Afterwards, the screw can be tightened and the blind rivet element or the bulge, respectively, is engaged by means of the emerging preload force of the screw.

If the adjustment contour is not circular, but has a hexagonal form, the blind rivet element exhibits a significantly higher resistance against torsion while being mounted, and in particular while being dismantled.

A further important advantage of the present invention as compared to the state of the art is the controlled deformability, preferably corresponding to the formation of an assignable maximal outer diameter of the bulge, in particular assignable such that it is larger than in case of conventional blind rivet elements known from the state of the art.

In addition, the height of the adjustment contour in combination with the bearing stress can interact with the bulge in a way that targeted controlling of the bearing stress and the diameter of the bulge are achieved. Besides, the blind rivet element is also centred, but without the need of having a circular shape, it may rather have a beam-symmetric shape, e.g. a polygon-like shape.

Further advantageous embodiments and appropriate further developments of the present invention are characterized in the additional claims.

Whilst the blind rivet element applied above already has a curvature, in particular a protrusion, a blind rivet element as stipulated by the invention with only one adjustment contour may be inserted into the bore of the object and subsequently engaged therein, whereby the curvature is created as a short intermediate state during the compression of the blind rivet element, in particular in a mould, but is afterwards continuously deformed to a bulge until the compression ends.

The outer side of the shaft can be warmed up or annealed, in particular can be made incandescent, e.g. by means of induction, in order to specify the location where the protrusion forms.

The warming up or heating creates a destabilisation, such that the curvature is formed during the compression and subsequently the bulge is formed from it.

The present invention finally involves the use of a blind rivet element according to the above mentioned type of blind rivet element.

BRIEF DESCRIPTION OF THE DRAWINGS

There are various possibilities to implement and further develop the present invention in an advantageous manner, as explained above. For this purpose, it is referred to the embodiments and developments, features and advantages of the present invention as elucidated below with reference to the FIGURE.

It is shown in:

FIG. 1 a schematic cross section of an embodiment of a blind rivet element as stipulated by the invention that is manufactured according to the present invention.

DETAILED DESCRIPTION

The blind rivet element generally referred to by the reference sign 5 is inserted into an object 6 with a bore 61 that is only accessible from one side (=in the embodiment of FIG. 1 from the upper side).

The blind rivet element 5 has a head 51 that has a circular shape in the embodiment according to FIG. 1, as seen from the top. This head 51 adjoins with a circular ring area 52 to the edge region of the one end of the bore 61.

A hollow shaft 53 adjoins to the head 51, the outer side of which has an outer diameter smaller than the head 51. This shaft 53 turns into an inner thread 54, at the end of the blind rivet element 5 facing away from the head 51, that is provided in the shaft 53 at a distance from the head 51.

The shaft 53 is provided with a radially outwardly protruding adjustment contour 55 in the region of the head 51, preferably formed as a centering element, which can be pre-formed by means of extrusion, preferably by means of cold extrusion, and which forms a surrounding collar with an assigned outer diameter in circumferential direction.

The adjustment contour 55 adjoins to the contact surface of the head 51 that is formed as circular ring area 52 and is stepped down from the outer side of the shaft 53 by means of a level or step in an area facing away from the head 51.

In an area facing away from the head of the adjustment contour, the adjustment contour 55 that preferably steps down by means of a level from the outer side of the shaft, has multiple ramps 56 extending up to the outer side of the shaft 53 that are preferably arranged uniformly along the circumference.

The shaft 53 has a protrusion 57 between the adjustment contour 55 and the inner thread 54 protruding in a radial direction outwards, but not beyond the adjustment contour 55, extending in circumferential direction and being rotationally symmetric.

The shaft 53 is destabilized, to some extent pre-compressed, against compression forces in this area by the premanufactured protrusion 57 and provides a controlled and well-defined deformation area when the blind rivet element 5 is engaged, on which the bulge is formed.

An application of the blind rivet element 5 is in particular a blind rivet nut.

The invention claimed is:

1. A blind rivet element comprising:
a head;
an adjoining hollow shaft, the outer side of which has an outer diameter smaller than the head; and
an internal thread provided inside the shaft and having an axial separation from the head;
characterized in that
the shaft is provided with a radially outwardly protruding adjustment contour in the region of the head, the adjustment contour being a centering element,
the shaft has a curvature formed in the radial direction,
the curvature is arranged between the adjustment contour and the internal thread, the curvature extends in a circumferential direction and is rotationally symmetric at any rotational turn, and the curvature is a fully closed bulge.

2. The blind rivet element according to claim 1, characterized in that the formed curvature is a protrusion, wherein the formed curvature is a protrusion or pre-bulge protruding outwardly, the protrusion or pre-bulge extending along the circumferential direction.

3. The blind rivet element according to claim 1, characterized in that the adjustment contour is formed as a surrounding collar in the circumferential direction with a predefined maximum outer diameter and a predefined height.

4. The blind rivet element according to claim 1, characterized in that the adjustment contour adjoins the contact surface of the head.

5. The blind rivet element according to claim 1, characterized in that the adjustment contour is circular, elliptical, squared, or hexagonal, or is provided with centering teeth.

6. The blind rivet element according to claim 1, characterized in that the adjustment contour steps down from the outer side of the shaft by means of a level or step in its region facing away from the head.

7. The blind rivet element according to claim 1, characterized in that the adjustment contour is stepped down by means of a level from the outer side of the shaft in its region facing away from the head and has at least one ramp in an axial direction along the circumference at the outer side of the shaft.

8. The blind rivet element according to claim 1, characterized in that the curvature has a maximal outer diameter that is not greater than the outer diameter of the adjustment contour.

9. Method for manufacturing a blind rivet element according to claim 1, characterized in that the adjustment contour is pre-formed in the region of the shaft.

10. Method according to claim 9, characterized in that the adjustment contour is pre-formed as a surrounding collar in the circumferential direction with a predefined maximal outer diameter and a predefined height.

11. Method according to claim 9, characterized in that the adjustment contour is pre-formed by means of cold extrusion.

12. Method according to claim 9, characterized in that the shaft is mechanically extruded between the adjustment contour and the internal thread in a radially outward direction leading to the formation of a protrusion or pre-bulge extending in the circumferential direction.

13. Method according to claim 9, characterized in that the shaft is at least partially warmed up in a region between the adjustment contour and the internal thread and afterwards is compressed in axial direction leading to the formation of the curvature.

14. Use of a blind rivet element according to claim 1 as a blind rivet nut.

* * * * *